United States Patent
Lou et al.

(10) Patent No.: US 12,433,483 B2
(45) Date of Patent: Oct. 7, 2025

(54) VISION SCREENING SYSTEMS AND METHODS

(71) Applicant: Welch Allyn, Inc., Skaneateles Falls, NY (US)

(72) Inventors: Yaolong Lou, Singapore (SG); Yuan Ing Chow, Singapore (SG); Shadakshari Devarajaiah Chikkanaravangala, Singapore (SG)

(73) Assignee: Welch Allyn, Inc., Skaneateles Falls, NY (US)

( * ) Notice: Subject to any disclaimer, the term of this patent is extended or adjusted under 35 U.S.C. 154(b) by 1019 days.

(21) Appl. No.: 17/344,838

(22) Filed: Jun. 10, 2021

(65) Prior Publication Data

US 2021/0393120 A1 Dec. 23, 2021

Related U.S. Application Data

(60) Provisional application No. 63/041,550, filed on Jun. 19, 2020.

(51) Int. Cl.
*A61B 3/103* (2006.01)
*A61B 3/00* (2006.01)
(Continued)

(52) U.S. Cl.
CPC ............ *A61B 3/103* (2013.01); *A61B 3/0025* (2013.01); *A61B 3/14* (2013.01); *G16H 30/40* (2018.01)

(58) Field of Classification Search
CPC .. A61F 2009/00846; A61F 2009/00872; A61F 9/008; A61F 2009/00848;
(Continued)

(56) References Cited

U.S. PATENT DOCUMENTS

| 4,740,072 A | 4/1988 | Griffin et al. |
| 7,331,669 B2 | 2/2008 | Elsner |

(Continued)

FOREIGN PATENT DOCUMENTS

| CN | 101991404 A | 3/2011 |
| CN | 110575134 A | 12/2019 |

(Continued)

OTHER PUBLICATIONS

The PCT Search Report and Written Opinion mailed Feb. 23, 2023 for PCT Application No. PCT/US2022/050390, 18 pages.

(Continued)

*Primary Examiner* — Brandi N Thomas
(74) *Attorney, Agent, or Firm* — Lee & Hayes, P.C.

(57) ABSTRACT

A system includes system housing, an eccentric radiation source, and a radiation sensor. The radiation produced by the eccentric radiation source can be collected by the radiation sensor to generate images of retinas for a patient. The system also includes a vision screening device connected with the eccentric radiation source and the radiation sensor via the system house that can control and synchronize actions for the eccentric radiation source and the radiation sensor. The vision screening device further analyzes the images generated by the radiation sensor via neural network algorithms to determine spherical error slopes, refractive errors, and recommendations for the patient.

19 Claims, 7 Drawing Sheets

(51) Int. Cl.
*A61B 3/14* (2006.01)
*G16H 30/40* (2018.01)

(58) Field of Classification Search
CPC ........ A61F 9/00825; A61F 2009/00851; A61F 2009/00853; A61F 2009/0087; A61F 2009/0088; A61F 9/00804; A61F 9/00806; A61F 9/00802; A61F 9/00812; A61F 2009/00844; A61F 2009/00882; A61F 2009/00897; A61F 9/00829; A61B 3/1015; A61B 3/103; A61B 3/112; A61B 3/12; A61B 3/113; A61B 3/14; A61B 3/0008; A61B 3/0016; A61B 3/0025; A61B 3/0041; A61B 3/111; A61B 3/145; A61B 3/0091; A61B 3/13; A61B 5/0077; A61B 3/10; A61B 2017/00694; A61B 3/00; A61B 3/005; A61B 3/107
See application file for complete search history.

(56) References Cited

U.S. PATENT DOCUMENTS

| | | |
|---|---|---|
| 7,618,143 B2 | 11/2009 | Clark et al. |
| 8,317,325 B2 | 11/2012 | Raguin et al. |
| 8,403,480 B2 | 3/2013 | Chen et al. |
| 9,336,439 B2 | 5/2016 | Savvides et al. |
| 9,427,152 B2 | 8/2016 | Lewis |
| 9,517,008 B1 | 12/2016 | Berme et al. |
| 10,051,208 B2 | 8/2018 | Dainty et al. |
| 10,368,743 B2 | 8/2019 | Gerrans et al. |
| 10,451,895 B2 | 10/2019 | Macnamara et al. |
| 10,602,926 B2 | 3/2020 | Wang |
| 2006/0227302 A1 | 10/2006 | Harbers |
| 2006/0244915 A1 | 11/2006 | Clemons et al. |
| 2007/0052924 A1 | 3/2007 | Nozawa et al. |
| 2007/0171372 A1 | 7/2007 | Seal et al. |
| 2008/0030984 A1 | 2/2008 | Harbers |
| 2010/0193705 A1 | 8/2010 | Rasnow |
| 2011/0157550 A1 | 6/2011 | Chen et al. |
| 2011/0270596 A1 | 11/2011 | Weeber |
| 2012/0212598 A1 | 8/2012 | Mowrey |
| 2015/0272438 A1 | 10/2015 | Yao et al. |
| 2016/0081543 A1 | 3/2016 | Mowrey |
| 2016/0089021 A1 | 3/2016 | Mowrey |
| 2016/0262617 A1 | 9/2016 | Gerrans |
| 2017/0027440 A1 | 2/2017 | Mowrey |
| 2017/0344107 A1* | 11/2017 | Aghara .................. G06F 3/011 |
| 2018/0041679 A1* | 2/2018 | Dalke .................. H04N 23/743 |
| 2018/0084996 A1 | 3/2018 | Su et al. |
| 2018/0332205 A1 | 11/2018 | Hawthorne et al. |
| 2019/0117064 A1 | 4/2019 | Fletcher et al. |
| 2019/0133435 A1 | 5/2019 | Browne et al. |
| 2019/0294858 A1* | 9/2019 | Creedon .................. A61B 3/11 |
| 2020/0084430 A1 | 3/2020 | Kalarn et al. |
| 2020/0113433 A1 | 4/2020 | Neal |
| 2020/0129063 A1 | 4/2020 | McGrath et al. |
| 2020/0225706 A1 | 7/2020 | Jung et al. |
| 2021/0330185 A1 | 10/2021 | Krukowski et al. |
| 2021/0345872 A1 | 11/2021 | Wiggermann et al. |
| 2021/0386287 A1 | 12/2021 | Lou et al. |
| 2022/0076417 A1 | 3/2022 | Bremer et al. |

FOREIGN PATENT DOCUMENTS

| | | | |
|---|---|---|---|
| EP | 3381350 A1 | 10/2018 | |
| IN | 202041007419 | 2/2020 | |
| KR | 100796355 | 1/2008 | |
| KR | 100869998 | 11/2008 | |
| KR | 100904254 | 6/2009 | |
| KR | 20140111157 A | 9/2014 | |
| KR | 101999225 | 7/2019 | |
| MX | 2017012316 A | 3/2019 | |
| WO | WO2009089509 | 7/2009 | |
| WO | WO 2014167491 * | 10/2014 | ............ G06V 40/20 |
| WO | WO2020010138 A1 | 1/2020 | |
| WO | WO2020145697 A1 | 7/2020 | |

OTHER PUBLICATIONS

Office Action for U.S. Appl. No. 17/347,079, mailed on Dec. 12, 2023, Yaolong Lou, "Determining Refraction Using Eccentricity in a Vision Screening System", 19 pages.
Extended European Search Report mailed Nov. 22, 2021 for European Patent Application No. 21180364.8, 8 pages.
Brousseau, et al., "Hybrid Eye-Tracking on a Smartphone with CNN Feature Extraction and an Infrared 3D Model," Sensors, vol. 20, No. 2, 2020, 21 pages.
Chen et al., "Infrared Retinoscopy", Photonics 2014, Published Oct. 3, 2014, pp. 303-pp. 322.
Office Action for U.S. Appl. No. 17/531,320, dated Mar. 27, 2025, 12 Pages.
Office Action for U.S. Appl. No. 17/347,079, mailed on Apr. 8, 2024, Lou et al., "Determining Refraction Using Eccentricity in a Vision Screening System", 21 pages.
Search Report for European Application No. 22896520.8, Dated Feb. 14, 2025, 9 pages.

* cited by examiner

VISION SCREENING SYSTEMS AND METHODS

CROSS REFERENCE TO RELATED APPLICATIONS

The present application claims priority of U.S. Provisional Patent Application No. 63/041,550, which was filed Jun. 19, 2020 and is incorporated herein by reference in its entirety.

TECHNICAL FIELD

This application is directed to medical equipment, and in particular, to systems and methods associated with determining refractive error, spherical error, and/or other parameters.

BACKGROUND

Visual screening in individuals typically includes one or more tests to determine various deficiencies associated with the patient's eyes. Such vision tests may include, for example, refractive error tests, convergence tests, accommodation tests, visual acuity tests, and the like. While one or more of the above tests may be related, each test has a respective purpose. For instance, in a refractive error test, the person is typically positioned within a measurement range associated with a vision screening device. Once the person is properly positioned, the screening device can be used to direct light onto the person's retinas. Sensors on the device may then collect corresponding light that is reflected by the retinas, and the device may determine a refractive error for each eye based on characteristics of the reflected light.

However, while various vision screening devices exist, such devices are typically cumbersome and complicated to use. Additionally, current methods utilize manual alignment, manual determinations, range-finding components, and/or large rooms/facilities while testing patients. Further, additional systems may utilize complicated and specialized equipment to complete patient tests. As a result, existing vision screening devices commonly utilize equipment such as range finders, optics for center light sources for image capture, and other specialized components that increase the cost, size, and operational complexity of visual screening systems. Additionally, existing vision screening devices utilize calibration curves for refractive error tests that introduce inaccuracies and errors in recommendations provided to medical practitioners and patients.

The various examples of the present disclosure are directed toward overcoming one or more of the deficiencies noted above.

SUMMARY

In an example of the present disclosure, a system can include a light source operable to generate an eccentric source of visible or near infrared (NIR) radiation. The eccentric source of radiation can be comprised of a plurality of point radiations sources that are disposed radially surrounding a radiation sensor. Additionally, the plurality of point sources can be predominantly disposed in a two-dimension plane surrounding the radiation sensor. Further, the system can include an anterior surface that is comprised of the radiation sensor and the eccentric source of radiation and a posterior surface that is comprised of an interactive display. Refractive error, as determined by the system of the present disclosure, may be represented by three parameters: sphere, cylinder and axis. The parameters are a description of the imperfectness of the optics of the eye, mainly due to lens and eyeball shape. The reflection of the eccentric light by the retina may be used to measure the refractive error of the eye. The system can also include a controller operable to cause the interactive display to output an image included in a visual acuity examination based at least in part on generation of the visible beam.

For instance, an example method of the present disclosure includes a refractive error test that collects a set of images from a patient over a timeframe. Additionally, the method includes monitoring, via a radiation sensor, a retina of a patient and periodically emitting, via a radiation source, near infrared (NIR) radiation for a duration of the timeframe. The duration for emission of the NIR radiation can be determined based at least in part on an image capture rate of the radiation sensor. Accordingly, the radiation sensor can capture a plurality of images, wherein a CPU may select, based at least on the duration that the radiation source emitted NIR radiation, a set of images for the refractive error test from the plurality of images and analyze the set of images to determine the refractive error of the eye. The duration of the NIR radiation emission can be configured such that the set of images are selected based at least on the set of images depicting the retina of the patient being fully illuminated by the NIR radiation during image capture.

Further, an example device of the present disclosure includes an eccentric radiation source configured to generate one or more beams of near infrared (NIR) radiation, an optics component configured to receive the one or more beams of NIR radiation and to direct the one or more beams of NIR onto a retina of a patient, and a radiation sensor configured to collect reflected NIR radiation from the retina and to provide information indicative of the reflected NIR to a processor. Additionally, the processor can be configured to identify a pupil of the patient based at least in part on the information, cause an image capture device of the system to capture a plurality of images of the pupil, determine a plurality of pupil positions based at least in part on the plurality of images, and determine a refractive error of the patient based at least on the plurality of pupil positions. Further, the eccentric radiation source can be comprised a plurality of radiation point sources configured in meridians (e.g., lines of radiation point sources extending from the radiation sensor at rotational offsets) and eccentricities (e.g., a group of radiation point sources arranged around the radiation sensor at a radial distance). Accordingly, the processor can capture images once a focused state is achieved and generate a refractive error from the plurality of images.

Moreover, an example system of the present disclosure includes a processor, operably connected to an eccentric radiation source and a radiation sensor. In particular, the processor can cause the eccentric radiation source to generate radiation that illuminates a pupil and a retina of a patient and cause the radiation sensor to collect reflected radiation from the pupil and the retina of the patient. Additionally, the processor can cause the radiation sensor to capture a series of images based at least on a determination that the reflected radiation satisfies a focus state threshold. Further, the processor can determine one or more parameters associated with a detected pupil that enable the normalization of the series of images. Accordingly, the processor can utilize neural networks to analyze an intensity profile and identify the refractive errors of the patient eyes.

BRIEF DESCRIPTION OF THE DRAWINGS

Features of the present disclosure, its nature, and various advantages, may be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
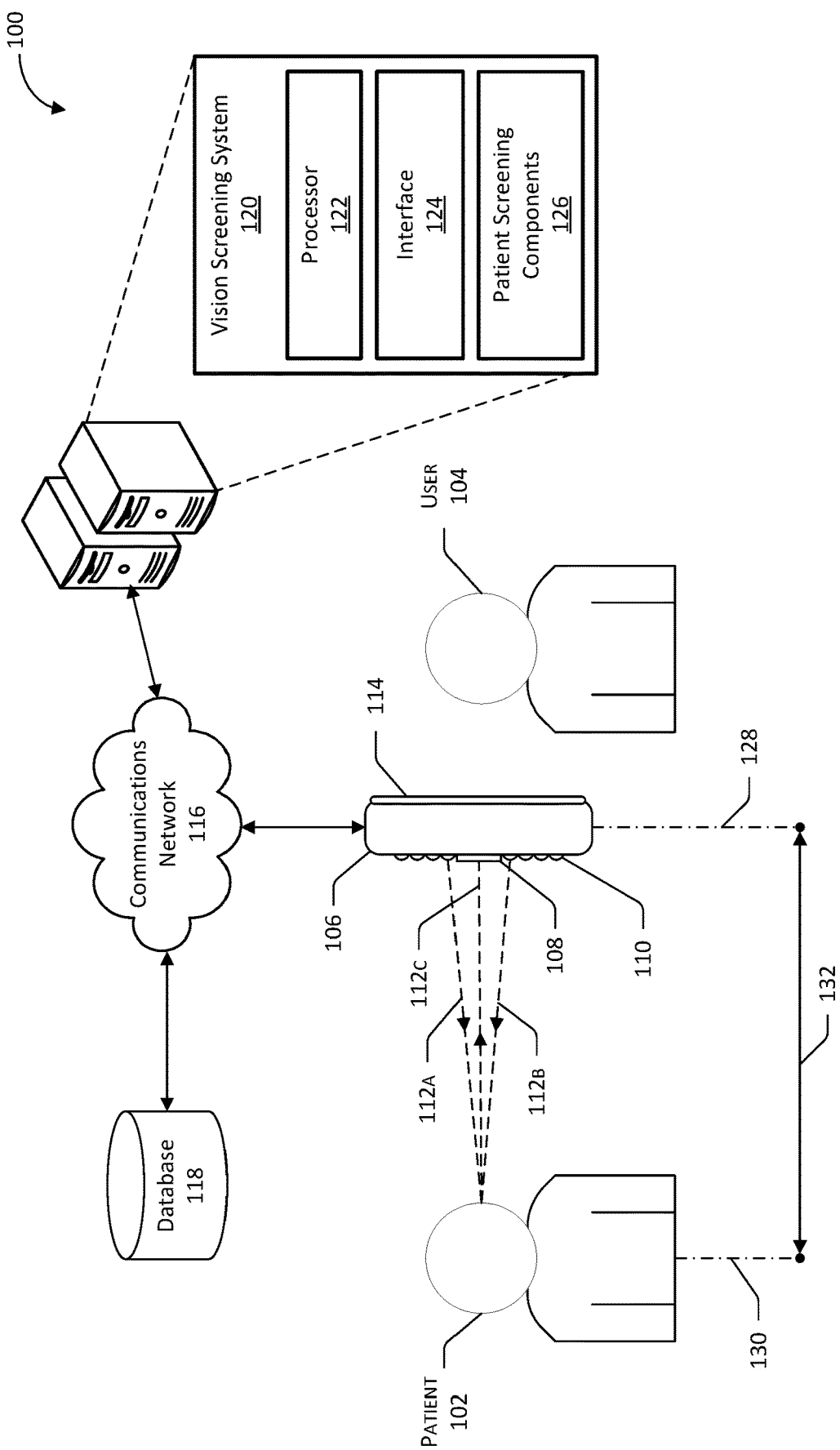
FIG. 1 illustrates an example system of the present disclosure. In some implementations, components of the example system shown in FIG. 1 may be used to perform one or more tests associated with refractive error screening.

The present disclosure is directed to, in part, a vision screening system and corresponding methods. Such an example vision screening system may be configured to perform one or more vision tests on a patient and to output the results of the vision test(s) to a user of the device, such as a physician or a physician's assistant. For example, the vision screening system may generate one or more beams of radiation, via one or more radiation sources, and may be configured to direct such beams at the retinas of the patient. The system may collect corresponding light that is reflected by the retinas and may determine a refractive error for one or both eyes of the patient based at least in part on characteristics of the collected light. Moreover, the system may generate one or more images from the light that is reflected from the retinas of the patient over a period of time. Additionally, the system may process the one or more images such that the refractive error is determined for the patient. As such, in any of the examples described herein, the results of the various vision tests performed using the system may include one or more measurements obtained by the vision screening device included in the system. In addition, the system may generate a recommendation and/or diagnosis associated with the patient for display to the user of the vision screening device. For example, by utilizing standard testing data and/or machine learning techniques, the system may evaluate the measurements determined by the system to provide a recommendation to the user regarding the vision of the patient (e.g., whether the patient passed the test, requires additional screening, etc.). As such, the system described herein may provide automated diagnosis recommendations in order to assist the physician or other user of the vision screening device.

In any of the examples described herein, the various tests performed using a vision screening system may have respective distance requirement or other parameters that must be met in order to ensure accurate testing results. For instance, during a refractive error test performed using the vision screening system, it may be recommended that the patient be spaced from the vision screening device by a distance of approximately three feet or approximately one meter. It should be noted that due to the compact and/or mobile design of the vision screening system (e.g., the vision screening system is a handheld device, a mobile device, a tablet, a smartphone, etc.), the vision screening device may be configured to account for variation in the distance. Accordingly, example vision screening systems of the present disclosure may be configured to utilize a focusing algorithm to account for variations in the distance between the patient and the device, provide instructions to the patient and/or the physician to adjust the distance, or otherwise achieve proper spacing for the refractive error test.

Additionally, in any of the examples herein, a system may include a vision screening device housing configured to contain the vision screening system. In some examples, the vision screening device housing may be removably connected to a user device via a mount, a user device case, or other apparatus for securing the vision screening device housing and the user device. In other examples, a vision screening device base may include a stem that is vertically, rotationally, and/or otherwise moveably connected to the vision screening device housing. In some examples, the vision screening device may be removably connected to the stem of the vision screening device base, wherein the user device may be removably connected to the base via the vision screening device housing. In other examples, the user device may be removably connected to the stem, and the vision screening device housing may be removably connected to the user device.

Additional details pertaining to the above-mentioned techniques are described below with reference to FIGS. 1-8. It is to be appreciated that while these figures describe example systems and devices that may utilize the claimed methods, the methods, processes, functions, operations, and/ or techniques described herein may apply equally to other devices, systems, and the like.

FIG. 1 illustrates an example system 100 for vision screening according to some implementations. As illustrated in FIG. 1, a vision screening system may be utilized to perform a retina scan for a patient 102. For instance, a user 104 may utilize a vision screening device 106 and/or other components of the system 100 to administer a vision screening test on a patient 102 to determine the vision health of the patient 102. As described herein, the vision screening device 106 may be configured to perform a refractive error test via a sensor 108 and an eccentric radiation source 110. Additionally, the vision screening device 106 may be configured to emit radiation in the visible band and/or the NIR band via the eccentric radiation source 110 and capture reflected visible and/or NIR radiation 112c via the sensor 108. Further, the eccentric radiation source 110 may emit a plurality of radiation beams, including radiation beam 112a and 112b. It should be understood that, while FIG. 1 depicts the system 100 including a single vision screening device 106. In some additional examples, the system 100 may include any number of local or remote vision screening devices substantially similar to the vision screening device 106, configured to operate independently and/or in combination, and configured to communicate via the network 116. In some further examples, the system 100 may include one or more databases 118 and one or more vision screening systems 120 comprised of one or more processors 122, one or more network interfaces 124, and/or patient screening components 126. The patient screening components 126 may include one or more programs, modules, engines, instructions, algorithms, and/or other patient screening components that are executable by the processor(s) 122.

As described herein, the vision screening device 106 and/or vision screening system 120 may be configured to perform refractive error testing on the patient 102. For example, refractive error testing may include displaying emitting radiation beams 112a and 112b, such as a visible and/or NIR light, configured to illuminate the eyes of the patient 102. In response, the vision screening device 106 may detect the pupils and/or lenses of the eyes of the patient 102, acquire images and/or video data of the pupils/lenses via the sensor 108, and may transmit the vision screening data, via the network 116, to the vision screening system 120 for analysis. Alternatively, or in addition, the vision screening device 106 may perform the analysis locally. It should be noted that the sensor 108 may include optics components that one or more lenses, windows, prisms, filters, mirrors, and/or any other devices configured to collect and direct the reflected beam 112c of visible and/or NIR radiation generated by the eccentric radiation source 110. In some further examples, the optics component 146 may comprise a collimating lens, a convergent, lens, a divergent lens, and/or any other substantially transparent lens or series of lenses configured to assist in directing such the reflected beam(s) 112c to impinge the sensor 108.

In examples, a memory associated with the vision screening device 106 and/or one or more of the patient screening components 126 may be configured to store and/or access data associated with the patient 102. For example, the patient 102 may provide data (referred to herein as "patient data") upon initiating a vision screening test. For instance, when the vision screening device 106 and/or vision screening system 120 initiates a vision screening test, the patient 102 may provide, or the user 104 may request, patient data including demographic information, physical characteristics, preferences, and similar information regarding the patient 102. For example, the patient 102 may provide demographic information such as name, age, ethnicity, gender, and the like. The patient 102 may also provide physical characteristic information such as height of the patient 102. In such examples, the user 104 may request the patient data while the screening is in progress, or before the screening has begun. In some examples, the user 104 may be provided with predetermined categories associated with the patient 102, such as predetermined age ranges (e.g., six to twelve months, one to five years old, etc.), and may request the patient data in order to select the appropriate category associated with the patient 102. In other examples, the user 104 may provide a free form input associated with the patient data. In still further examples, an input element may be provided to the patient 102 directly.

The vision screening device 106 may be configured to generate image and/or video data associated with the patient 102 at the onset of the vision screening test. For example, the vision screening device 106 may include one or more digital cameras, motion sensors, proximity sensors, or other image capture devices configured to collect images and/or video of the patient 102, and one or more processors of the vision screening device 106 may analyze the collected images and/or video to determine, for example, the height of the patient 102, the distance of the patient 102 from the screening device, and/or any of the patient data described above.

Alternatively, or in addition, the vision screening device 106 may be configured to transmit the images, video, and/or any other collected information to the vision screening system 120, via the network 116, for analysis. In any such examples, the vision screening system 120 may store such information in the patient screening components 126 and/or in an external database 118. For example, the database 118 may comprise memory or computer-readable media substantially similar to and/or the same as the computer-readable media associated with the patient screening components 126. The database 118 may be accessible by the vision screening system 120, and/or by the vision screening device 106, via the network 116. In any such examples, the database 118 may be configured to store patient data in association with a patient ID (e.g., a name, social security number, an alphanumeric code, etc.) or other unique patient identifier. When the patient 102 and/or the user 104 enters the patient ID, the patient screening components 126 may access or receive patient data stored in association with the patient ID.

The optics components of the visual screening device 106 may include the sensor 108 and the eccentric radiation source 110. For instance, the eccentric radiation source 110 may comprise a plurality of light emitting diodes (LEDs) or other light sources capable of producing visible and/or NIR radiation beams 112a and 112b. For example, the eccentric radiation source 110 may comprise collimating lens, convergent lens, divergent lens, and/or any other substantially transparent lens or series of lenses configured to assist in directing such beams 112a and 112b to illuminate the retinas of patient 102. Additionally or alternatively, the eccentric light source 110 can utilize undirected light sources and/or dispersion filters associated with the light sources to illuminate the patient 102 and the retinas of the patient 102.

For example, the sensor 108 can be configured to determine a distance 132 between a patient position 130 and a visual screening device position 128. In such examples, the visual screening device 106 can be configured to maintain the distance 132 (approximately 3 feet or approximately 1 meter) between the patient 102 and the sensor 108. Additionally, the visual screening device 106 may be configured to determine the patient position 130 relative to the visual screening device position 128 and provide the user 104 instructions, via the user interface 114, that cause the user 104 to modify the visual screening device position 128 or the patient 102 to modify the patient position 130 such that the distance 132 is properly maintained. Further, the visual screening device 106 may be configured to provide the user 104 instructions, via the user interface 114, that cause the user 104 to rotate the visual screening device 106 around a vertical axis or that causes the patient 102 to rotate such that the patient 102 is facing an anterior face of the visual screening device 106 comprised of the sensor 108 and the eccentric radiation source 110. Similarly, the visual screening device 106 may be configured to provide the user 104 instructions, via the user interface 114, that cause the user 104 to modify the visual screening device position by increasing an elevation or a height of the visual screening device, at the visual screening device position 128, relative to the patient 102.

The user interface 114 may be disposed on a posterior face of the visual screening device 106 that substantially faces the user 104 during operation of the visual screening device 106. The user interface 114 may include a graphical user interface configured to display information to the user 104 and/or receive input from the user 104 during a vision test. For example, the user interface 114 may be configured to receive input from the user 104 regarding the patient 102, such as any of the patient information described herein. Further, the user interface 114 may be configured to display information regarding the vision screening device 106 (e.g., a current setting or operating mode of the device, etc.), the distance of the patient 102 from the vision screening device 106, the quality of the environment and/or the focus of the vision screening device 106, the progress of the screening, options for transmitting data from the vision screening device 106 to the vision screening system 120, one or more measurements and/or values generated during the vision screening, etc. The user interface 114 may comprise, for example, a liquid crystal display (LCD) or active matrix organic light emitting display (AMOLED). The user interface 114 may also be touch-sensitive to receive input from the user 104.

As used herein, the network 116 is typically any type of wireless network or other communication network known in the art. Examples of network 116 include the Internet, an intranet, a wide area network (WAN), a local area network (LAN), and a virtual private network (VPN), cellular network connections and connections made using protocols such as 802.11a, b, g, n and/or ac.

In some examples, the visual screening device 106 can include a microprocessor or a control unit substantially similar to one or more components of the vision screening system 120 described above. For example, the vision screening device 106 may comprise one or more processors 122 and/or other hardware and/or software components configured to operably control the sensor 108, the eccentric radiation sources 110, the user interface 114, and other components of visual screening device 106. For instance, visual screening device 106 may include a single processing unit (e.g., a single processor) or a number of processing units (e.g., multiple processors), and can include single or multiple computing units and/or multiple processing cores. The processor(s) 122 of the visual screening unit 126 can be implemented as one or more microprocessors, microcomputers, microcontrollers, digital signal processors, central processing units, state machines, logic circuitries, and/or any devices that manipulate signals based on operational instructions. For example, the processor(s) 122 of the visual screening device 106 can be one or more hardware processors and/or logic circuits of any suitable type specifically programmed or configured to execute the algorithms, operations, and methods described herein. The processor(s) of the visual screening device 106 can be configured to fetch and execute computer-readable instructions stored in the patient screening components 126, which can program the processor(s) of the visual screening device 106 to perform the functions described herein. Additionally or alternatively, the processor(s) of the visual screening device 106 can be configured to fetch and execute computer-readable instructions stored in computer-readable media and/or other memory of/local to the vision screening device 106.

As described herein, a processor, such as processor(s) 122, can be a single processing unit or a number of processing units, and can include single or multiple computing units or multiple processing cores. The processor(s) 122 can be implemented as one or more microprocessors, microcomputers, microcontrollers, digital signal processors, central processing units, state machines, logic circuitries, and/or any devices that manipulate signals based on operational instructions. For example, the processor(s) 122 can be one or more hardware processors and/or logic circuits of any suitable type specifically programmed or configured to execute the algorithms and processes described herein. The processor(s) 122 can be configured to send, receive, and transmit communications via the network interface 124. Additionally, the processor(s) 122 can be configured to fetch and execute computer-readable instructions stored in the computer-readable media of the patient screening components 126, which can program the processor(s) 122 to perform the functions described herein.

The network interface(s) 124 may enable wired and/or wireless communications between the components and/or devices shown in system 100 and/or with one or more other remote systems, as well as other networked devices. For instance, at least some of the network interface(s) 124 may include a personal area network component to enable communications over one or more short-range wireless communication channels. Furthermore, at least some of the network interface(s) 124 may include a wide area network component to enable communication over a wide area network. Such network interface(s) 124 may enable, for example, communication between the vision screening system 120 and the vision screening device 106 and/or other components of the system 100, via the network 116.

The patient screening components 126 may include volatile and nonvolatile memory and/or removable and non-removable media implemented in any type of technology for storage of information, such as computer-readable instructions, data structures, program modules, or other data. Memory can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. The patient screening components 126 can include various types of computer-readable storage media and/or can be a tangible non-transitory media to the extent that when mentioned, non-transitory computer-readable media exclude media such as energy, carrier signals, electromagnetic waves, and signals per se.

The patient screening components 126 can include any number of functional components that are executable by the processor(s) 122. In many implementations, these functional components comprise instructions or programs that are executable by the processor(s) 122 and that, when executed, specifically configure the one or more processor(s) 122 to perform the actions associated with one or more vision tests.

Although not illustrated in FIG. 1, in some examples the patient screening components 126 may include computer-readable media configured to store a measurement data component. In such examples, the measurement data component may be configured to receive, access, and/or analyze testing data collected and/or detected by the vision screening device 106 during one or more vision screening procedures. For example, the measurement data component may be configured to receive, via the network 116, image data and/or video data generated by the vision screening device 106 during a vision screening test. The measurement data component may analyze the image data and/or video data to determine one or more measurements associated with the patient 102, such as a gaze of the patient 102 throughout the screening, a location of the pupils of the patient 102 at points in time of viewing the graphical representation, a diameter of the pupils, an accommodation of the lens, motion information associated with the eyes of the patient 102, and the like.

Further, although not illustrated in FIG. 1, the patient screening components 126 may also include computer-readable media configured to store a threshold data component. The threshold data component may be configured to receive, access, and/or analyze threshold data associated with standard vision testing results. For example, in such embodiments, a threshold data component may be configured to access or receive data from one or more additional databases (e.g., the database 118, a third-party database, etc.) storing testing data, measurements, and/or a range of values indicating various thresholds or ranges within which testing values should lie. Such thresholds or ranges may be associated with patients having normal vision health with similar testing conditions. For example, for each testing category, standard testing data may be accessed or received by the threshold data component and may be utilized for comparison against the measurement data stored by the measurement data component described above. For instance, the threshold data associated with the toddler testing category may include standard pupil measurements, and/or a threshold range of values which the testing values should not exceed or fall below (e.g., a standard value range) for toddlers when displayed each graphical representation. For example, when testing for accommodation in the patient 102, an example threshold data component may be configured to store information associated with the amplitude of accommodation and age (e.g., Donder's Table).

Figure 2:
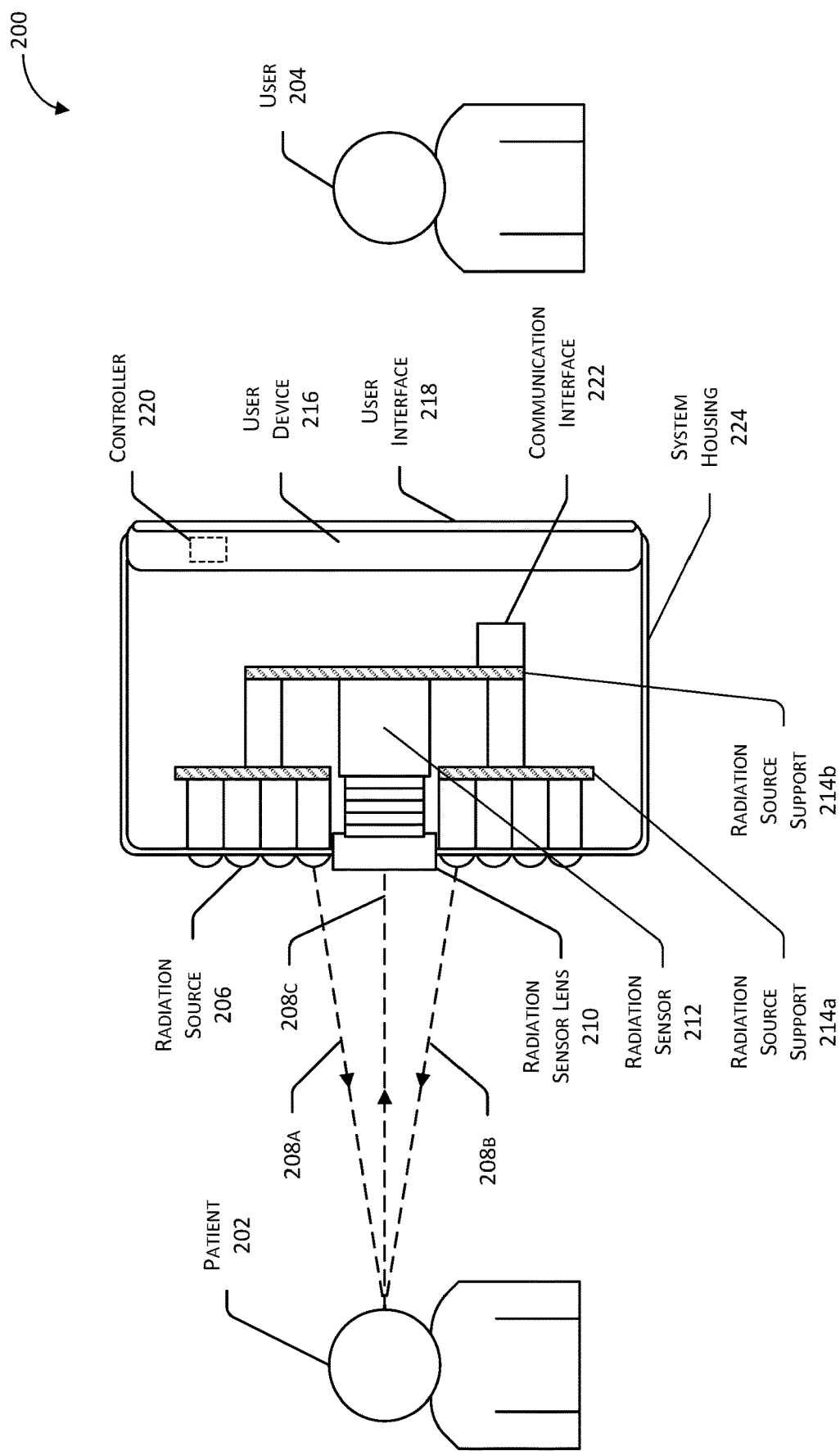
FIG. 2 illustrates another example system of the present disclosure.

FIG. 2 illustrates an additional example system 200 of the present disclosure. In some examples, the system 200 may include one or more of the same components included in the system 100. In some additional examples, the system 200 can include different components that provide similar functions to the components included in the system 100. As shown in FIG. 2, the system 200 can be utilized to determine a refraction error associated with one or more eyes of a patient 202. In particular, a user 204 can cause the system 200 to activate a radiation source 206 such that beams of radiation 208a and 208b are emitted towards the patient 202. Additionally, a reflected beam of radiation 208c can be captured by a radiation sensor lens 210 and directed onto a radiation sensor 212. Further, the system 200 can be controlled via a user device 216 and a user interface 218. In some examples, the user device 216 may include a controller 220 configured to operate the radiation source 206, the radiation sensor lens 210, and the radiation sensor 212 during the refractive error test.

In the example system 200 of FIG. 2, the radiation source 206 may be comprised of a plurality of radiation point sources that emit visible or NIR electromagnetic waves when powered and/or provided an activation signal (e.g., LEDs, Organic Light Emitting Diodes (OLEDs), light bulbs, etc.). The radiation source 206 may be configured such that the plurality of radiation point sources is arranged in one or more eccentricities and/or one or more meridians. For instance, the radiation source 206 of FIG. 2 depicts eight radiation point sources that are configured in four eccentricities. Additionally, the radiation source 206 of FIG. 2 depicts the eight radiation point sources in a single meridian that extends vertically from the radiation sensor lens 210. It should be noted that the one or more eccentricities may describe a radial distance of one or more radiation point sources from the radiation sensor lens 210. Similarly, the one or more meridians may describe a rotational orientation of one or more additional radiation point sources relative to a vertical axis of the system 200. In some additional examples, the radiation source 206 can include a plurality of the radiation point sources arranged in three meridians that extend radially in four meridians (e.g., a first that extends from vertically from 0 degrees and 180 degrees, a second that extends from 60 degrees and 240 degrees, and a third that extends from 120 degrees and 300 degrees).

In the example system 200 of FIG. 2, the radiation source 206 may be configured to activate one or more subsets of the plurality of radiation point sources during a refractive error test. For instance, six radiation point sources arranged in three meridians can be sequentially activated for an inner eccentricity, a middle eccentricity, and an out eccentricity. It should be noted that while the above example describes the various eccentricities being activated as a whole, the system 200 may activate subsets of individual meridians and/or individual eccentricities. Accordingly, the radiation source 206 may be configured to provide one or more illumination patterns during the refractive error test. Additionally, while the example system of FIG. 2 depicts only radiation beams 208a and 208b being emitted by the radiation source 206, the system 200 may be configured to emit any number of radiation beams as an illumination patter for the refractive error test.

In the example system of FIG. 2, the system 200 may include the radiation sensor lens 210 to direct the reflected radiation beam 208c to the radiation sensor 212. In some examples, the radiation sensor lens 210 may be substantially similar or the same as the optical components discussed with respect to FIG. 1. In some additional examples, the radiation sensor lens 210 may be configured adjust the aperture width and the focal length of the lens such that the radiation sensor 212 captures a high-quality image, sequence of images, and/or video of the one or more retinas of the patient 202 under illumination by the radiation source 206 (e.g., a clear image, an image without blurred features, etc.).

In the example system of FIG. 2, the system 200 may be configured such that the emission of visible and/or NIR radiation beams 208a and 208b by the radiation source 206 is triggered based at least on a framerate and/or a capture rate associated with the radiation sensor 212. For instance, the radiation sensor 212 may be configured to capture images and/or video at a rate of thirty frames per second. Additionally, the radiation source 206 may be configured to emit visible and/or NIR radiation in bursts, flashes, packets, periods, etc. that are configured to be partially or fully synchronized with the capture rate of the radiation sensor 212. Accordingly, the system 200 may be operated such that some or all of the images captured by the radiation sensor 212 are illuminated for the duration of a frame capture period (e.g., for images captured at thirty frames per second, the frame capture period would be a thirtieth of a second).

In the example system of FIG. 2, the system 200 may be configured such that the radiation source 206, the radiation sensor lens 210, and the radiation sensor 212 can be secured by one or more radiation source supports 214 and/or a system housing 224. For instance, the radiation source support 214 can be one or more substrates that may be removably or non-removably attached to the radiation source 206, the radiation sensor lens 210, and/or the radiation sensor 212. A first radiation source support 214a may be configured to provide structural support to the plurality of radiation point sources of the radiation source 206. Additionally, the radiation sensor lens 210 and/or the radiation sensor 212 may be radially encompassed in at least a two-dimensional plane by the first radiation source support 214a. It should be noted that while the first radiation source support 214a is depicted by FIG. 2 as being attached to a posterior surface of the individual radiation point sources, the individual radiation point sources may be partially embedded in the first radiation source support 214a at any point along the primary axis (e.g., the axis perpendicular to the anterior, light emitting surface and the posterior surface of the radiation point source).

In the example system of FIG. 2, the radiation sensor 212 of the system 200 may be configured to receive and/or access light, image, and/or video data associated with a patient 202 being evaluated during a refractive error test. In particular, the radiation sensor 212 may be configured to capture, or generate, image and/or video data during the vision test. For example, as described herein, image/video data may be transmitted, via the communication interface(s) 222, to the user device 216 for processing and analysis. In some additional examples, the radiation sensor 212 includes, for example, a complementary metal-oxide semiconductor (CMOS) sensor array, also known as an active pixel sensor (APS), or a charge connected device (CCD) sensor. In some examples, the radiation sensor lens 210 is supported by the system 200 and positioned in front of the radiation sensor 212. In still further examples, the radiation sensor 212 has a plurality of rows of pixels and a plurality of columns of pixels. For example, the radiation sensor 212 may include approximately 1280 by 1024 pixels, approximately 640 by 480 pixels, approximately 1500 by 1152 pixels, approximately 2048 by 1536 pixels, and/or approximately 2560 by 1920 pixels. The radiation sensor 212 may be capable of capturing approximately 25 frames per second (fps), approximately 30 fps, approximately 35 fps, approximately 40 fps, approximately 50 fps, approximately 75 fps, approximately 100 fps, approximately 150 fps, approximately 200 fps, approximately 225 fps, and/or approximately 250 fps. Note that the above pixel values and frames per second are exemplary, and other values may be greater or less than the examples described herein.

In the example system of FIG. 2, the radiation sensor 212 may include photodiodes having a light-receiving surface and have substantially uniform length and width. During exposure, the photodiodes convert the incident light to a charge. The radiation sensor 212 may be operated as a global shutter. For example, substantially all of the photodiodes may be exposed simultaneously and for substantially identical lengths of time. Alternatively, the radiation sensor 212 may be used with a rolling shutter mechanism, in which exposures move as a wave from one side of an image to the other. Other mechanisms are possible to operate the radiation sensor 212 in yet other examples. The radiation sensor 212 may also be configured to capture digital images. The digital images can be captured in various formats, such as JPEG, BITMAP, TIFF, etc.

In the example system of FIG. 2, the system 200 may be additionally configured such that the second radiation source support 214b is attached to the radiation sensor 212 and the first radiation source support 214a. Similar to the first radiation source support 214a, the second radiation source support 214b may be configured to provide structural support to the radiation sensor lens 210, the radiation sensor 212, and the first radiation source support 214a. Additionally, the radiation sensor 212 may be partially embedded and radially encompassed in a two-dimensional plane at any position along the primary axis of the radiation sensor 212. Further, a communication interface 222 can be provided structural support by the second radiation source support 214b.

In the example system of FIG. 2, the system 200 may be further configured such that the system housing may provide structural support for the individual radiation point sources of the radiation sources 206, the radiation sensor lens 210, the first radiation source support 214a, the second radiation source support 214b, the user device 216, and/or other components of the system 200. For instance, the system housing 224 can be an enclosed or partially enclosed structure comprised of at least an anterior surface penetrated or perforated such that the radiation source 206 may emit the radiation beams 208a and 208 while the radiation sensor lens 210 may collect the radiation beam 208c. Additionally, a posterior surface of the system housing 222 may comprise a socket, a bracket, a port, or other connector that provides a connection interface for the user device 216. Alternatively, the posterior surface of the system housing 222 may include a user interface 218 embedded in or attached to the system housing 222 and integrated with the system 200.

In the example system of FIG. 2, the system 200 may include the first radiation source support 214a and the second radiation source support 214b, wherein the radiation source supports may be integrated circuit boards, printed circuit assays (PCAs), printed circuit boards (PCBs), or other circuit board configured to provide support and signaling to the radiation source 206, the radiation sensor lens 210, the radiation sensor 212, the communication interface 222, and other components of the system 200. The radiation source supports may comprise processors, microprocessors, microcontrollers, memory, computer readable media, drivers for the individual radiation point sources, and other support components for the system 200. Further, the radiation source supports can provide communication with the user device 216 and/or the user interface 218 via circuitry and/or connections routed through the system housing 222 or the communications interface 220.

In the example system of FIG. 2, the communication interface 222 may be configured to provide data connections and network communications with the user device 216 and/or the communication network 116 described with respect to FIG. 1. For instance, the communication interface 222 may be configured to connect to external databases (e.g., the database 118) to receive, access, and/or send screening data using wireless connections. Wireless connections can include cellular network connections and connections made using protocols such as 802.11a, b, g, and/or ac. In other examples, a wireless connection can be accomplished directly between the vision screening device 106 and an external display using one or more wired or wireless protocols, such as Bluetooth, Wi-Fi Direct, radio-frequency identification (RFID), infrared signals, and/or Zigbee. Other configurations are possible. The communication of data to an external database 118 or an external system can enable report printing or further assessment of the visual test data of the patient 202. For example, collected data and related test results may be wirelessly transmitted and stored in a remote database accessible by authorized medical professionals.

Figure 3:
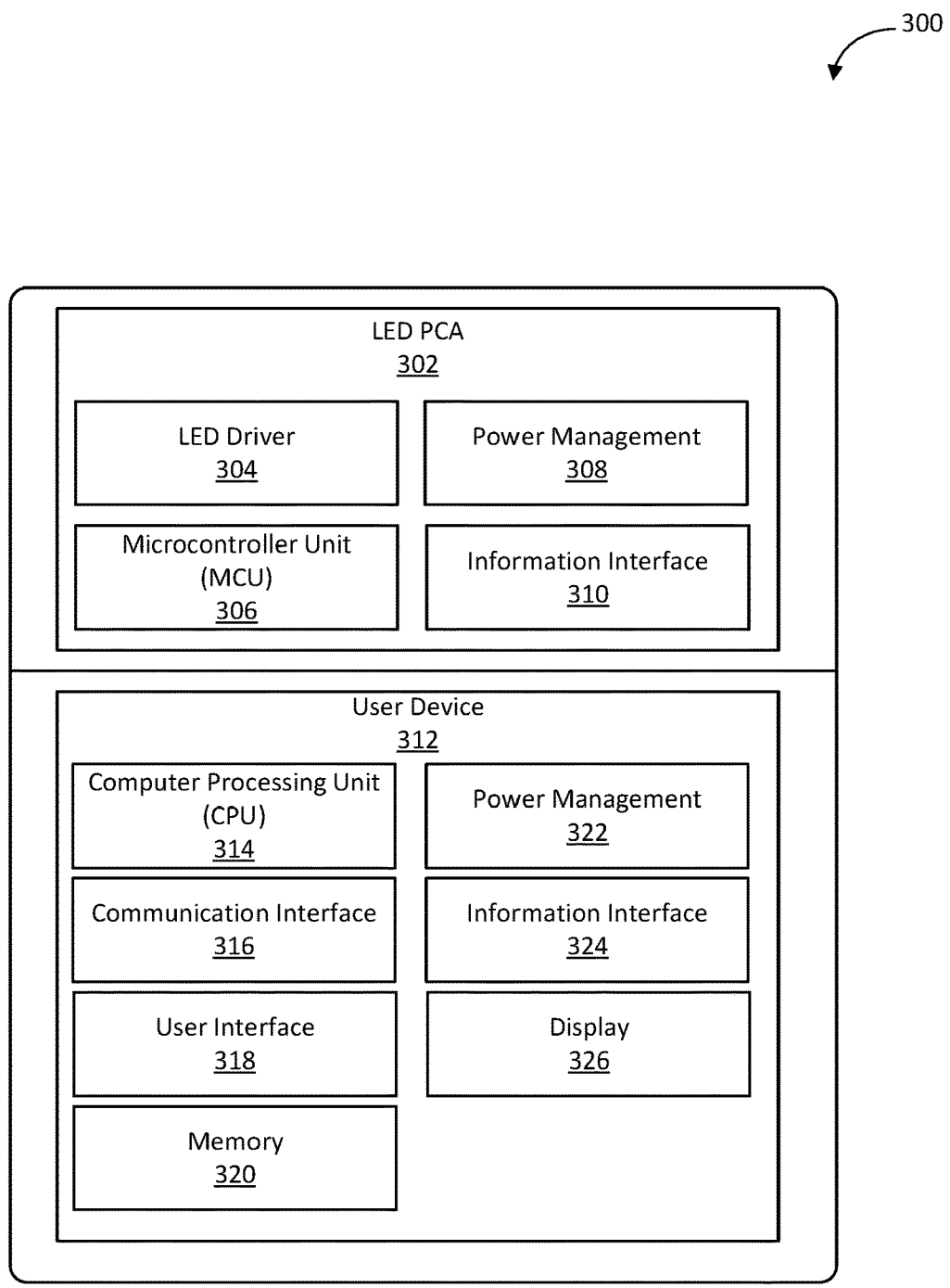
FIG. 3 illustrates still another example system of the present disclosure. Similar to FIG. 1, in some implementations, components of the example systems shown in FIG. 2 and may be used to perform one or more tests associated with vision screening.

FIG. 3 illustrates another example system 300 of the present disclosure. As can be seen in FIG. 3, the system 300 may include one or more similar of the same components as the components included in the systems 100 and 200. In some examples of FIG. 3, the system 300 can interact with the components described with respect to the systems 100 and 200 to execute one or more methods according to this disclosure. For example, as shown in FIG. 3, the system 300 may include an LED PCA 302 comprised of an LED driver 304, a microcontroller unit (MCU) 306, power management systems 308, and an information interface 310. Additionally, a user device 312 can be included in the system 300, the user device 312 comprised of a computer processing unit (CPU) 314, a communication interface 316, a user interface 318, memory 320, power management systems 322, an information interface 324, and a display 326. Further, components of the LED PCA 302 can be configured to operate the radiation emitting systems and radiation capturing systems described with respect to FIGS. 1 and 2.

In some examples of FIG. 3, the LED driver 304 may operate and control the radiation source 206. For instance, the LED driver 304 may provide one or more commands, received via the MCU 306, for selectively activating and deactivating individual radiation point sources of the visual screening system. It should be noted that the LED driver 304 may operate to activate the individual radiation point sources independent of the meridian and eccentricity associations established between the radiation point sources. Additionally, the LED driver 304 may be configured to receive and distribute power from the power management system 308 to the radiation source 206. Further, the LED driver 304 may communicate with the CPU 314 and receive one or more indications providing instruction for radiation source activation and activation patterns.

In some examples of FIG. 3, the MCU 306 may be configured to perform or partially perform methods described by FIGS. 4-7. Additionally or alternatively, the MCU 306 may operate to control the radiation sensor 212 to capture an image, a plurality of images, and/or a video of one or more retinas associated with a patient 202. The MCU 306 may communicate with the CPU 314 via the information interface 310 to receive indications of routines and/or algorithms to be performed and to transmit the capture image(s) and video captured during the routines and/or algorithms. In some additional examples of FIG. 3, the MCU 306 may be configured to perform high speed video frame capture while the LED driver 304 causes the radiation source 206 to illumination the patient 202. In particular, the MCU 306 may receive an indication for a series of light pattern images to be captured within a timeframe associated with a refraction test. Accordingly, the CPU 314 can synchronize the radiation source 206 flashing the patient 202 and illuminating the retinas of the patient 202 such that the radiation sensor 212 may the capture of images and/or video for the series of light pattern images of the refraction test. Additionally, due to the timeframe provided for completion of the refraction test, the synchronization of the LED driver 304 with the MCU 306 by the CPU 314 enables the series of light pattern images to be captured despite the latency between the LED driver 304, the MCU 306, and the CPU 314.

In the example shown in FIG. 3, the CPU 314 of the system 200 may comprise one or more controllers, processors, and/or other hardware and/or software components configured to operably control the LED driver 304, the MCU 306, communication interface 316, the user interface 318, the display 326, and/or other components of the system 200. For instance, the CPU 314 shown in FIG. 3 may include a single processing unit (e.g., a single processor) or a number of processing units (e.g., multiple processors), and can include single or multiple computing units or multiple processing cores. The CPU 314 shown in FIG. 3 can be implemented as one or more microprocessors, microcomputers, microcontrollers, digital signal processors, central processing units, state machines, logic circuitries, and/or any devices that manipulate signals based on operational instructions. For example, CPU 314 shown in FIG. 3 can be one or more hardware processors and/or logic circuits of any suitable type specifically programmed or configured to execute the algorithms, operations, and methods described herein. The CPU 314 shown in FIG. 3 can be configured to fetch and execute computer-readable instructions stored in memory 320, which can program the CPU 314 to perform the functions described herein. Additionally or alternatively, the CPU 314 shown in FIG. 3 can be configured to fetch and execute computer-readable instructions stored in patient screening components 126 of the vision screening system 120 (FIG. 1).

In any of the examples described herein, the CPU 314 shown in FIG. 3 may be configured to receive various information, signals, and/or other inputs from one or more of the user interfaces 318, the radiation sensor 212, the display 326, and/or other components of the system 200. In some examples, the user interface 318 may receive such inputs from the user 204, and one or more such inputs may comprise a command or a request for the system 200 to generate, display, provide, and/or otherwise output one or more images, beams of radiation, dynamic stimulus, or other output included in a refractive error examination or other vision test. For example, the CPU 314 shown in FIG. 3 may be operable to cause the radiation source 206 to generate, display, provide, and/or otherwise output one or more images, beams of radiation, dynamic stimulus, or other output included in a refractive error examination or other vision test.

In some examples, the CPU 314 can be configured to synchronize capture of high-speed images or frames with periodic illumination of the patient 202 via the radiation source 206. It should be noted that the synchronization of high-speed image and/or frame capture with the illumination of the patient 202 may be utilized to compensates for communication delays, between the CPU 314 and the LED driver 304 and between the CPU 314 and the MCU 306, caused by the information interfaces 310 and 324. For instance, where the CPU 314 may communicate with the MCU 306 via a first communication method (e.g., through USB video class (UVC) communications where the images and/or frames observed by the radiation sensor 212 and the MCU 306 are transmitted to the CPU for recording), the exchange of commands, images observed by the radiation sensor 212, and other information can be exchanged with relatively low latency between transmission of information by either the CPU 314 or the MCU 306 and the receipt of the transmission by either the MCU 306 or the CPU 314 respectively. However, the CPU 314 may communicate with the LED driver 304 via a second communication method (e.g., through Bluetooth communications), wherein the second communication method exchanges information with relatively high latency between transmission and receipt of information. Further, in some additional examples, the LED driver 304 and the MCU 306 may be unable to exchange communications. Accordingly, the high latency between the CPU 314 and the LED driver 304 may introduce a delay between the CPU 314 transmitting an illuminate command to the LED driver 304 and the completion of the illuminate command for each image of the series of light pattern images that a complete series of light pattern images is not captured during the timeframe provided for the refraction test.

In a first example, synchronization of the LED driver 304 can enable the radiation source 206 to illuminate the patient 202 while an image and/or a frame of the series of light pattern images is captured. By modifying a flash duration to sufficiently exceeds the time for capture of a single image and/or frame via the radiation sensor 212 (e.g., establish the flash duration to be at least double the time for capturing a frame), the CPU 314 can ensure that at least one frame or image captured during the flash will be fully illumination. Accordingly, the CPU 314 modification of the flash duration can enable the series of light pattern images captured during the timeframe to include a series of images that may be utilized for the refraction test. It should be noted that each activation of the radiation source 206 includes at least a wholly illuminated frame (e.g., the radiation source 206 does not deactivate during the frame capture) captured by the radiation sensor 212 and may include one or more partially illuminated frames. Additionally, any frames from the series of images and/or filters that overlap with a deactivation of the radiation source 206 (e.g., flash ends while the frame is captured, causing the frame to be partially illuminated) are discarded.

In a second example, the MCU 306 can synchronize of activation of the eccentric radiation source 206 by the LED driver 304 with the capture of the series of images and/or frames by the radiation sensor 212. Additionally, the MCU 306 can receive a command from the CPU 314 that triggers the synchronization of eccentric radiation source activation and image capture in such that a series of images may be captured. Further, the synchronization of the eccentric radiation source activation and the image capture may be achieved by utilizing the communication pathways between the MCU 306 and the CPU 314 and the MCU 306 and the LED driver 304 to issue commands. For example, where the information interface between the radiation sensor 212 and the MCU 306 permits, the MCU 306 can utilize unused information bandwidth to forward commands, via the information interface 310 to the LED driver 304 (e.g., the MCU 306 may utilize a VSYNC pin to transmit a VSYNC signal to the LED driver 304 and bypass the utilization of the Bluetooth connection to trigger the activation of the eccentric radiation source 206). Accordingly, the MCU 306 forward commands for radiation source activation to the LED driver 304, thereby causing the LED driver 304 to activate in synchronicity with the rate of frame capture at the radiation sensor 212 and bypassing the latency between the LED driver 304 and the CPU 314.

Continuing from the first example and the second example, the CPU 314 may encode a "start" image and/or frame for the series of light pattern images received from the MCU 306. In particular, the components of the LED PCA 302 are unaware of a start frame or image for the series of light pattern images. Additionally, CPU 314 may be configured to determine the start image associated with the LED driver 304 receiving a command to initiate one or more flashes via the radiation source 206 and the CPU 314 collecting the series of light pattern images. Accordingly, based at least on the flash duration, the CPU 314 may determine an illumination pattern for one or more images that indicates the start image for the series of light pattern images requested by the refraction error test. For example, where the flash duration is determined to be twice the time utilized to capture a single image, the illumination pattern can be a high light intensity image followed by a low light intensity image followed by an additional high light intensity image. In an additional example, where the flash duration is determined to be three times the time utilized to capture a single image, the illumination pattern can be two high light intensity images followed by a low light intensity image followed by an additional high light intensity image. In either of the above examples, the CPU 314 may identify the start image for the series of light pattern images recorded by the CPU 314 and encode the series of light pattern images with an identifier of the start image. It should be noted that encoding the start frame data into the series of light pattern images may comprise creating the illumination patter identified based at least on the flash duration and the time to capture a single image to encode the high illumination, low illumination, high illumination pattern, or other illumination pattern, into a sequence of images the precede the start image. Accordingly, an image processing algorithm may be configured to identify the start image of the refraction test for the series of light pattern images due to the embedded illumination pattern.

Further, the power management systems 308 and 322 may comprise any removable, rechargeable, and/or other power source known in the art and configured to store electrical power. The power management systems 308 and 322 may comprise one or more rechargeable batteries configured to selectively provide electrical current to the one or more components of the system 200 during use. For instance, the power management systems 308 and 322 may comprise one or more sealed lead acid batteries, lithium ion batteries, nickel cadmium batteries, nickel-metal hydride batteries, or other types of batteries configured to provide sufficient power to the LED driver 304, the MCU 306, the radiation source 206, the radiation sensor lens 210, the radiation sensor 212, the information interfaces 310 and 324, the CPU 314, the communication interface 316, the user interface 318, and/or other components of the described systems.

The communication interface(s) 316 of the system 200 shown in FIG. 3 may enable wired and/or wireless communications between the vision screening device 300 and one or more external databases 118, a communications network 116, and/or one or more components of the vision screening system 120 (FIG. 1), as well as with one or more other remote systems and/or other networked devices. For instance, the communication interface(s) 316 may include a personal area network component to enable communications over one or more short-range wireless communication channels. Furthermore, the communication interface(s) 316 may include a wide area network component to enable communication over a wide area network. In any of the examples described herein, the communication interface(s) 316 may enable communication between the system 200 and external resources via the network 116 (FIG. 1).

In some respects, the memory 320 shown in FIG. 3 may be similar to the patient screening components 126 described above with respect to the vision screening system 120 (FIG. 1). For example, the memory 320 may include volatile and nonvolatile memory and/or removable and non-removable media implemented in any type of technology for storage of information, such as computer-readable instructions, data structures, program modules, or other data. Such memory 320 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. The memory 320 can be a type of computer-readable storage media and/or can be a tangible non-transitory media to the extent that when mentioned, non-transitory computer-readable media exclude media such as energy, carrier signals, electromagnetic waves, and signals per se.

The memory 320 can be used to store any number of functional components that are executable and the images to be processed by the CPU(s) 314. In many implementations, these functional components comprise instructions or programs that are executable by the CPU(s) 314 and that, when executed, specifically configure the one or more CPU (s) 314 to perform the actions described herein and associated with one or more vision screening tests.

Other functional components stored in the memory 320 may include, among other things, a graphical representation data component, a measurement data component, a threshold data component, a notification component, a sensor data component, a range finder data component, a microphone data component, a light source control component, a machine learning component, and/or any other functional component associated with the operation of the system 200.

Figure 4:
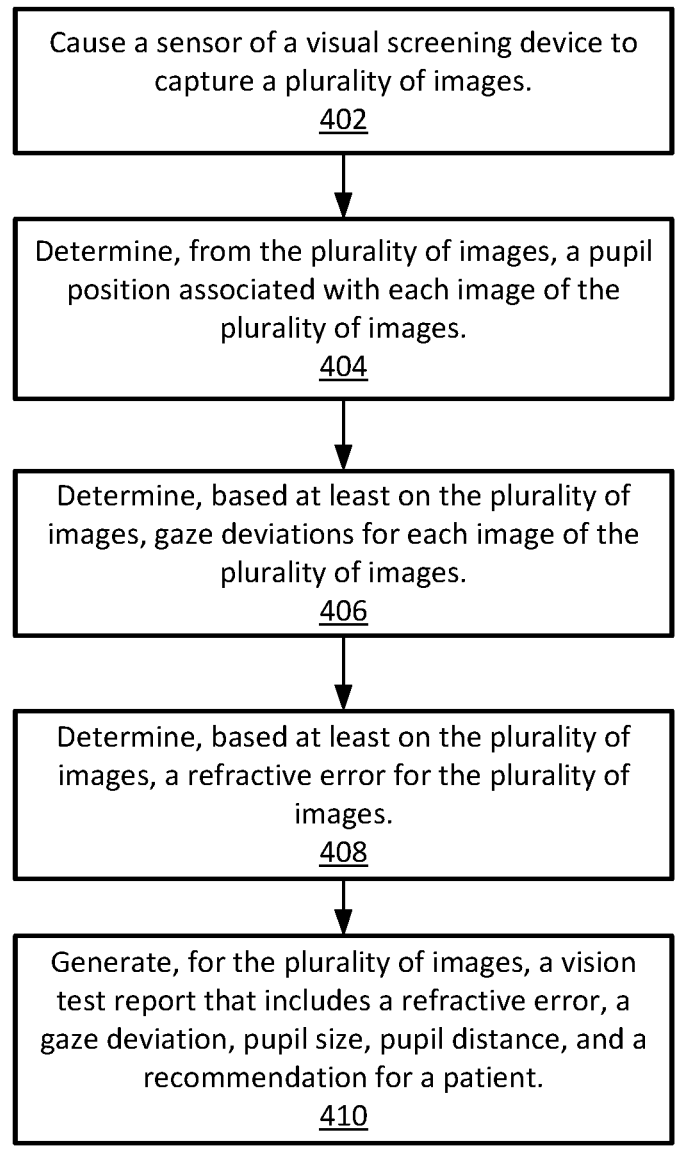
FIG. 4 provides a flow diagram illustrating an example method of the present disclosure.

FIG. 4 provides a flow diagram illustrating an example method 400 for vision testing, as described herein. The method 400 is illustrated as collections of blocks in a logical flow graph, which represents a sequence of operations that can be implemented in hardware, software, or a combination thereof. In the context of software, the blocks represent computer-executable instructions stored on one or more computer-readable storage media that, when executed by CPU(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the method 400. In some embodiments, one or more blocks of the method 400 can be omitted entirely.

At block 402, the CPU of a vision screening device 102 may determine whether a field of view observed by a radiation sensor is in a focused state. In some examples, the focused state indicates that a series of images may be captured for a refraction test. Additionally, the focused state can be identified by the satisfaction of one or more image state thresholds. The one or more image state thresholds may be associated with a clarity of an image (e.g., a lack of blurred features), a stability of the image, and/or other features associated with the subject of the image (e.g., eyes of a patient receiving a refraction test) observed within the field of view of the radiation sensor. Accordingly, where the CPU of a vision screening device 102 determines that the image satisfies the image state thresholds and is in the focused state, the CPU can cause the radiation sensor to capture a series of images (e.g., in some embodiment the series of images can include 25 frames) having a selection of LED illuminations of the eyes/retinas of the patient. Further, the CPU may cause the radiation sensor to capture the series of images where individual images of the series of images are captured in association with individual LED illuminations of the selection of LED illuminations. The determination of the focused state for the image and the capture of the series of images is discussed in greater detail by FIG. 5.

At block 404, the CPU of a vision screening device 102 may determine the relative position of individual images and/or frames of the series of images. In some examples, the radiation sensor captures the series of images in rapid succession and minimizes the positional drift between individual images. The positional drift, caused by shifts in radiation sensor location and movement of the patient, relocates the pupils within the region of interest between images captured by the radiation sensor. Accordingly, the CPU causes the radiation sensor to rapidly capture the series of images such that a position of the pupil in a preceding image can be utilized to identify potential locations of pupils in an image of the series of images as the previous location of pupils can identify regions of interest for analysis. The determination of pupil position based on a previous pupil position associated with a previous image is discussed in greater detail by FIG. 6.

At block 406, the CPU of a vision screening device 102 may determine gaze calculations that identify deviations of the pupil centers for both eyes. For instance, the CPU may enhance the contrast for the series of images such that pupil edge detection may be enhanced. Additionally, the CPU may detect the pupil edge and further enable pupil fitting to determine pupil center coordinates and pupil radius for the image. Further, the CPU may operate to determine glint position from the series of images indicated by positional coordinates associated with individual eyes captured by the series of images. Accordingly, the system 200 may remove the glint from the image, determine a gaze deviation based at least on the positional coordinates of the glint, and apply a Gaussian LPF (e.g., a Gaussian filter) to smooth the radiation intensity signal such that further signal processing can be performed.

At block 408, CPU may determine a refractive error for each eye of the patient. In some examples, the CPU can determine a spherical error (SE) slope based at least on one or more radiation intensity profiles determined from the series of images captured by the radiation sensor. For example, the CPU may extract a profile box that encompasses a range of detected radiation intensities for an image. Additionally, CPU can determine the SE slope from a linear function fitted to the radiation intensity profile along a primary axis of the extracted profile box. It should be noted that the determination of SE slope and refractive error is discussed in greater detail by FIG. 7.

At block 410, the CPU may generate a report based at least on the refractive error calculation for the patient. For instance, the CPU can, after determining the SE slope and the refractive error for individual images of the series of images, generate a report that lists the refractive error of Sphere (Ds), Cylinder (Dc), and Axis (Ax) of the Cylinder as well as gaze deviation, pupil size, pupil distance, and other pupil information for both eyes. Additionally, the CPU may include a referral for further treatment, for additional visual tests, a prescription for the individual eyes, and/or additional actions to be taken by the user 204 in the generated report. Accordingly, the CPU can present the generated report to the user 204 and/or the patient 202 via the user interface 218, cause a communication interface to transmit the report to an external database 118, and/or cause a communication interface to transmit to an external vision screening system 120 for further analysis or action.

Figure 5:
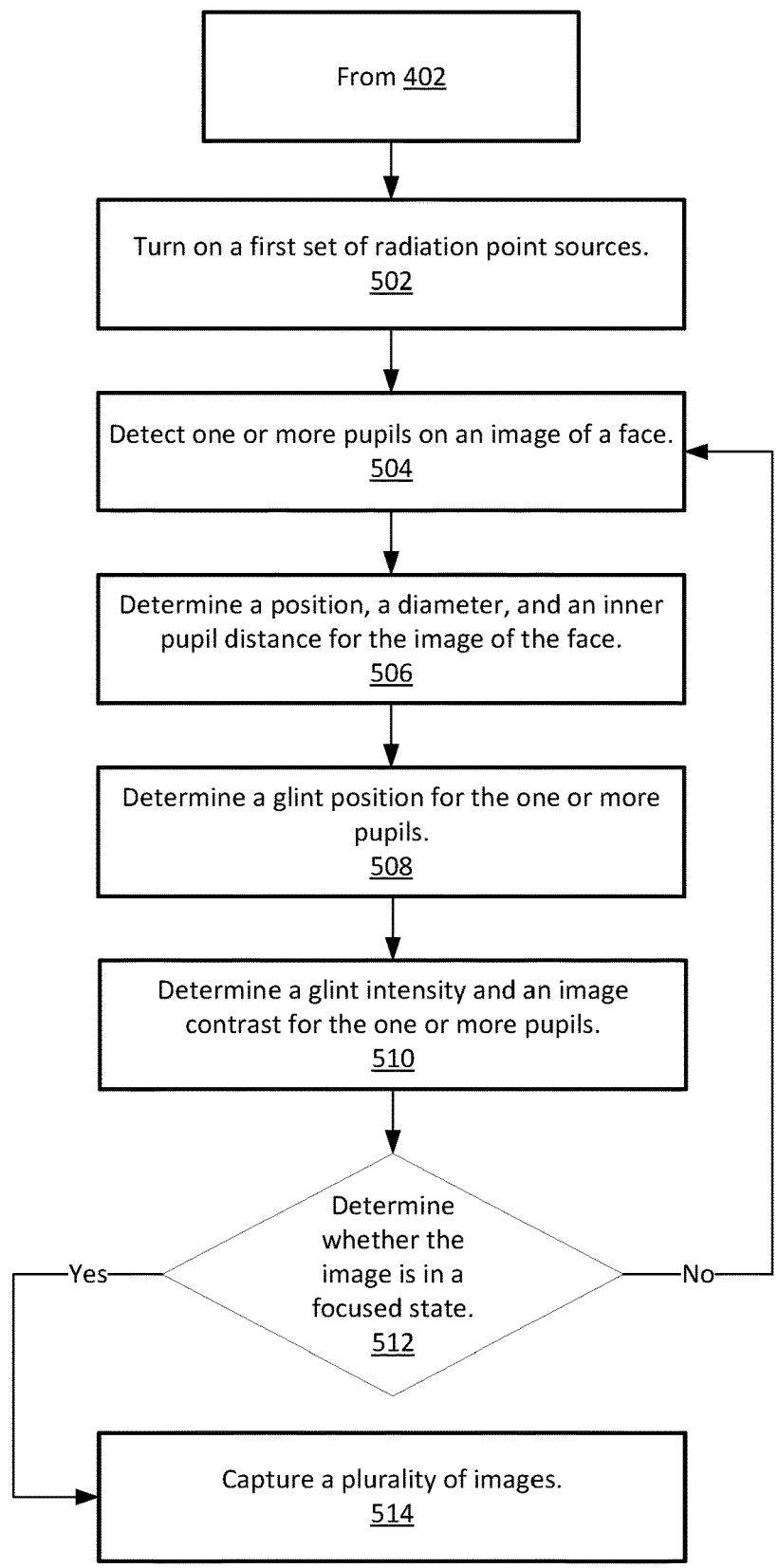
FIG. 5 provides a flow diagram illustrating another example method of the present disclosure.

FIG. 5 provides a flow diagram illustrating an example method 500 for vision testing, as described herein. The method 500 is illustrated as collections of blocks in a logical flow graph, which represents a sequence of operations that can be implemented in hardware, software, or a combination thereof. In the context of software, the blocks represent computer-executable instructions stored on one or more computer-readable storage media that, when executed by CPU(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the method 500. In some embodiments, one or more blocks of the method 500 can be omitted entirely.

At block 502, the CPU can cause a radiation sensor to capture a series of images for a vision test. In the example method, the CPU can determine at least a first set of radiation point sources, associated with the eccentric radiation source 206, to be activated for a first image. In some examples of the method, the CPU can determine a set of radiation point sources to be activated for each image of the series of images. In some additional examples, the CPU can determine multiple sets of radiation point sources to be activated for one or more images of the series of images. As noted above with respect to FIG. 2, the eccentric radiation source 206 can be configured such that a plurality of radiation point sources is positioned at meridians indicating rotational positioning and eccentricities indicating the radial positioning of the radiation point sources. The eccentric radiation source 206 can include one or more meridians and one or more eccentricities where the radiation point sources may be positioned. The individual sets of radiation point sources for the capture of the one or more images for the series of image may be comprised of radiation point sources selected from any combination of meridians and/or eccentricities. However, in some examples, it may be common for the sets of radiation point sources to be comprised of the radiation point sources from a single eccentricity or a single meridian.

At block 504, the CPU may detect one or more pupils on an image and/or from image data associated with a face of a patient 202. In the example method, CPU can execute facial recognition algorithms for the system 200, the user device 216, and/or the visual screening system 120 (FIG. 1). Additionally or alternatively, a user 204 of the system 200 can indicate that the image includes a face. In some examples, the CPU can identify the pupils as a first region of interest and a second region of interest based at least in part on the reflected radiation collected by the radiation sensor 212. Further, the CPU may detect and define the boundaries of the first region of interest and the second region of interest such that the pupils of the patient 202 are substantially or wholly encompassed by the regions of interest. In some additional examples of block 504, the radiation sensor may capture an image and the CPU may transmit the image, via a network, to vision screening system 120. Additionally, the vision screening system 120 can identify the pupils as the first region of interest and the second region of interest based at least on the reflected radiation collected by the radiation sensor 212. Further, the vision screening system 120 may detect and define the boundaries of the first region of interest and the second region of interest within the image such that the pupils of the patient 202 are substantially or wholly encompassed by the regions of interest.

In some examples of block 504, the eccentric radiation source 206 may contribute the inability of standard methods of pupil detection to identify the pupils within the first region of interest and the second region of interest of the series of images. In particular, the eccentric radiation source 206 may prevent a fully circular pupil from being detected by standard methods and may cause additional anomalies in pupil detection. Additionally, standard methods attempting to match the eccentrically illuminated pupil to calibration curves may fail to detect one or more pupils for the patient 202 due to the anomalous reflected light associated with the eccentric radiation source 206. Accordingly, in the example method, the CPU may operate a neural network algorithm trained to detect pupils illuminated by the eccentric radiation source 206. In some example methods, the neural network, can be trained by utilizing manually graded test data set and/or data sets comprised of previously analyzed images associated with feedback indications that provide data of successful identification of pupils and failed identification of pupils by the neural network. Additionally or alternatively, the neural network may be trained to identify eccentrically illuminated pupils independent of the system 200 and then deployed to perform pupil identification in association with the system 200. Further, the neural network may store images that have been analyzed by the neural network for manual grading and future training data set in the database 118, in the patient screening components 126, or in association with memory 320.

At block 506, the CPU may determine the pupil position within the region of interest, the pupil diameters, and the inner pupil distance. In the example method, the CPU can analyze the first region of interest to determine a first horizontal position and a first vertical position of a first pupil of the patient 202. Similarly, the CPU can analyze the second region of interest to determine a second horizontal position and a second vertical position of a second pupil of the patient 202. It should be noted that the first horizontal position, the second horizontal position, the first vertical position, and the second vertical position may identify positions for the first pupil and the second pupil in a two-dimension grid, a three-dimension mesh, or other coordinate system that allows the position of the pupils to be tracked. Additionally, the system 200 can determine a first pupil diameter, a second pupil diameter, and the inner pupil distance for the patient 202. Further, the CPU can determine the first pupil diameter, the second pupil diameter, and the inner pupil distance can be determined based at least on the coordinate system, an estimated distance to between the radiation sensor 212 and the patient 202 (e.g., the system 200 is to be place approximately 1 meter or approximately 3 feet from the patient 202), and/or other identification of an approximate size of the pupil features.

At block 508, the CPU may determine a glint position for the first pupil and/or the second pupil. For example, the glint position may be determined based at least on an intensity of reflected light that exceeds an intensity threshold and/or is a position associated with the highest intensity of reflected light within an image. The CPU may determine intensity values for individual positions and/or pixels of the image and/or the image data captured by the radiation sensor. Additionally, the CPU may compare intensity values associated with the image and determine an absolute maximum intensity value and/or one or more local maximum intensity values within the first region of interest and/or the second region of interest. Further, the CPU may identify the position and/or pixels associated with the absolute maximum intensity value for the first region of interest and/or the second region of interest as the glint position for the first pupil and/or the second pupil. Alternatively, the CPU may identify a region within the first region of interest and/or the second region of interest associated with an intensity of reflected light that exceeds the intensity threshold and determine that the region is associated with the glint position.

At block 510, the CPU may determine a glint intensity and an image contrast for the first pupil and/or the second pupil. For example, the glint intensity can indicate a luminous intensity value for the captured radiation at the glint position determined in block 508. The glint intensity can indicate data values for radiant energy, radiant energy density, radiant exposure, and/or other values indicating an amount of radiation captured by the radiation sensor for the glint position. Additionally, the image contrast can indicate a differential between the intensity values of a portion of the image covering the whole region of interest surrounding the pupil and the intensity values associated with the surrounding positions and/or pixels. Accordingly, the CPU can identify how intense the radiation captured by the radiation sensor 212 is for the position of the portion for contrast and utilize that information to identify a differential between the radiation collected at the position of the portion for contrast and radiation collected at positions surrounding the portion for contrast.

In some examples of block 510, the CPU may utilize the glint position, the glint intensity, and the image contrast for the first pupil and/or the second pupil to identify focusing logic adjustments for utilization in determining whether an image observed by the radiation sensor 212 is in a focused state based on one or more image state thresholds. For example, the CPU may utilize, individually or in combination, the glint intensity and the image contrast to determine whether a focusing quality for the image. In particular, a high glint intensity and/or a high image contrast may indicate that the image has a high focusing quality. Similarly, a low glint intensity and/or a low image contrast may indicate that the image has a low focusing quality. Additionally, the CPU may determine whether the glint intensity and/or the image contrast exceed a glint intensity threshold and/or an image contrast threshold to identify whether the image is associated with a focusing quality sufficient for further analysis. Alternatively, the CPU may determine whether the glint intensity and/or the image contrast satisfies an image contrast threshold that indicates, when satisfies, that the focusing logic of the radiation sensor should be adjusted and an additional image captured.

At block 512, the example method can cause the system 200 to determine whether an image observed by the radiation sensor 212 is in a focused state and whether a plurality of images can be captured. In the example method, a first image can be captured by the radiation sensor 212 while the patient 202 is illuminated by the radiations source 206 as described by block 502. After the variables from blocks 504-510 are determined by system 200, the system 200 may determine whether one or more image state thresholds are satisfied by the image. In some examples, the one or more image state thresholds may include: 1) determine whether a pupil diameter (e.g., the first pupil diameter and/or the second pupil diameter) is greater than 3 mm and less than 10 mm; 2) determine whether an inner pupil distance is greater than 30 mm and less than 100 mm; 3) determine that a glint intensity is greater than 220; and 4) determine that image contrast is greater than 20. Further, the system can determine a set of image state thresholds to be satisfied for the image to be in a focused state and approved by the system 200 (e.g., the system can determine that all four image state thresholds are to be satisfied for the image to be in a focused state). In response to a determination that the image is in a focused state and satisfied the set of image state thresholds, the system 200 can capture the series of image. It should be noted that in some examples, the system 200 can iteratively determine whether each image of the series of images satisfies the set of image state thresholds to maintain the focused state for the series of images. Additionally or alternatively, in some additional examples, the system 200 may determine whether a subset of the series of images passes the set of image state thresholds. Further, if a minimum number of consecutive images (e.g., the subset of the series of images) satisfy the set of image state thresholds and can be determined to be in a focused state, the system 200 can capture the remaining images for the series of images without further scrutiny.

At block 512, the example method can include a determination that the image captured by system 200 does not satisfy one or more of the image state thresholds. In some examples, the system 200 can execute corrective procedures to modify the distance between the system 200 and the patient 202 such that updated image variables (e.g., update pupil diameter, pupil distance, glint intensity, and contrast measurements based on a modified distance between the system 200 and the patient 202) are generated that satisfy the set of image state thresholds. In particular, where the pupil diameter and/or the pupil distance is determined to be below a lower threshold, the system 200 can indicate that the patient 202 is too far from the system. Additionally, where the pupil diameter and/or the pupil distance is determined to be above an upper threshold, the system 200 can indicate that the patient 202 is too close to the system. Further, if the pupil diameter and/or the pupil distance consecutively satisfy the related image state thresholds a minimum number of times, the system 200 can indicate that the patient 202 is in a good position and/or capture the series of images.

Accordingly, at block 512 of the example method, the system can determine whether the image or the series of images is in a focused state. In examples where the system 200 determines that the image(s) are in a focused state, the plurality of images can be captured at block 514. In examples where the system 200 determines that the images (s) are not in a focused state, the image(s) can be discarded and/or disregarded and the system can return to block 504.

Figure 6:
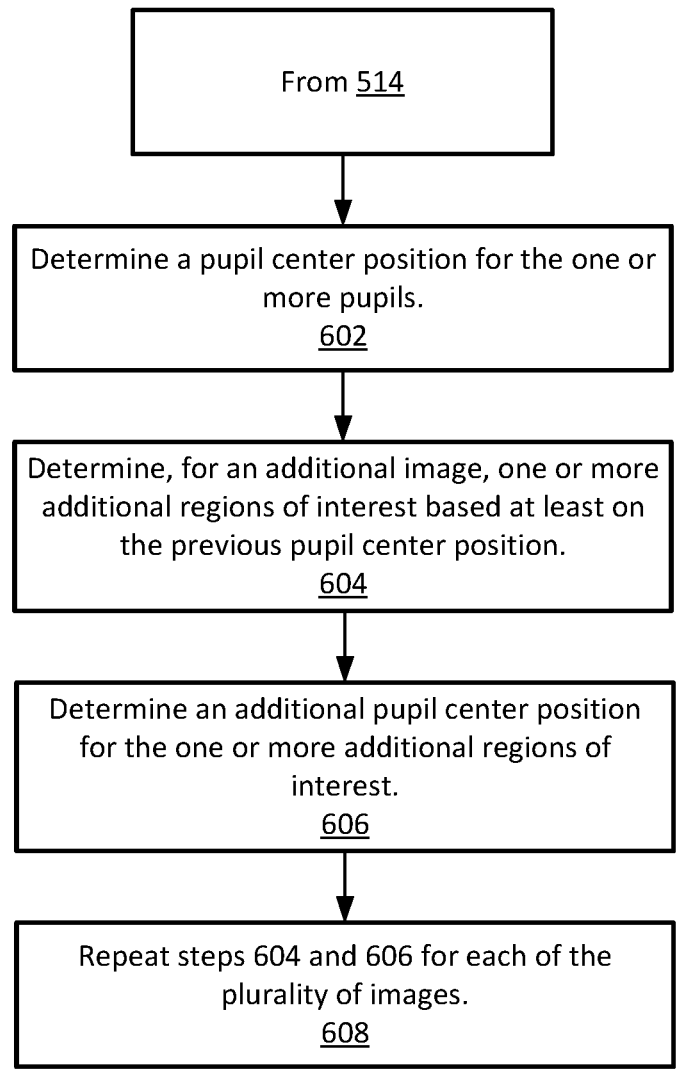
FIG. 6 provides a flow diagram illustrating still another example method of the present disclosure.

FIG. 6 provides a flow diagram illustrating an example method 600 for vision testing, as described herein. The method 600 is illustrated as collections of blocks in a logical flow graph, which represents a sequence of operations that can be implemented in hardware, software, or a combination thereof. In the context of software, the blocks represent computer-executable instructions stored on one or more computer-readable storage media that, when executed by CPU(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the method 600. In some embodiments, one or more blocks of the method 600 can be omitted entirely.

At block 602, the CPU can detect, for a first image of a series of images received from block 514, one or more pupils within the first image of the patient 202. Additionally, the CPU may determine a first region of interest associated with a first pupil and/or a second region of interest associated with a second pupil. Further, the CPU may determine first pupil center position for the first image of the series of images.

At block 604, the CPU may detect, based at least on the pupil center position for the first image, one or more additional regions of interest for an additional image. In some examples, the one or more additional regions of interest may be determined based at least on the pupil center position of the first image based at least on a high rate of image capture (e.g., 25 frames can be captured in less than 2.5 seconds) limiting the pupil center drift between frames. Accordingly, regions of interest for a successive image in the series of images (e.g., the additional image) may be determined based at least on the pupil center for the preceding image in the series of images (e.g., the first image). In some additional example, the difficulty in identifying eccentrically illuminated pupils may be compensated for by the low pupil center draft between frames. In particular, the CPU may be configured to generate a low difficulty image for pupil detection via activation of high success radiation point source sets of the eccentric radiation sources 206 for the first image. Additionally, once the one or more pupils are identified for the first image and the pupil center position determined, the CPU can utilize the low pupil center position drift to restrict the one or more additional regions of interest for the additional image and reduce the threshold for pupil detection by the neural network and/or the system 200.

At block 606, the example method may cause the CPU to identify, based at least on the one or more additional regions of interest, an additional pupil center position for the additional image. As noted above, limited pupil center drift and the additional regions of interest identified based at least on the pupil center location identified for the preceding image (e.g., the first image) enables the identification of the additional pupil center under low eccentric illumination scenarios, asymmetric illumination scenarios, and other scenarios that may be difficult for standard methods to analyze. Further, the additional pupil center position can be utilized for to determine one or more further regions of interest for a further image that succeeds the additional image. Accordingly, and at block 608 the utilization of a preceding pupil center position for a preceding image can enable the identification of a successive pupil center position for a successive image by the neural network.

Figure 7:
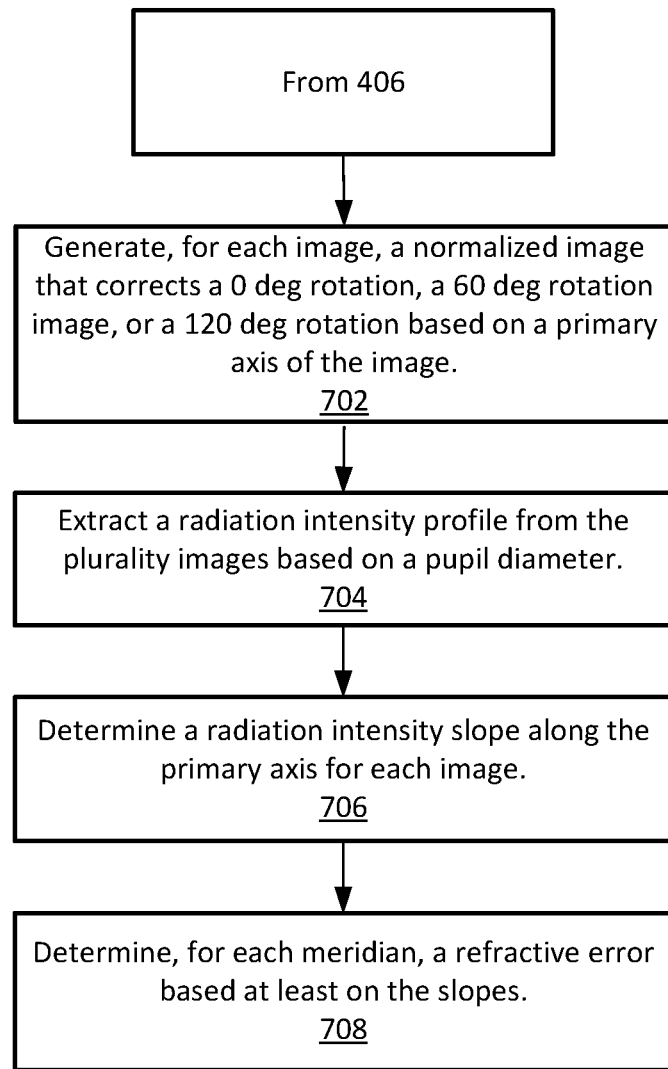
FIG. 7 provides a flow diagram illustrating yet another example method of the present disclosure.

FIG. 7 provides a flow diagram illustrating an example method 700 for vision testing, as described herein. The method 700 is illustrated as collections of blocks in a logical flow graph, which represents a sequence of operations that can be implemented in hardware, software, or a combination thereof. In the context of software, the blocks represent computer-executable instructions stored on one or more computer-readable storage media that, when executed by CPU(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the method 700. In some embodiments, one or more blocks of the method 700 can be omitted entirely.

At block 702, the CPU may generate normalized images from individual images of a series of images. For example, the CPU may utilize the individual images to generate 0 degree rotation corrected, 60 degree rotation corrected, and 120 degree rotation corrected images to normalize the series of images against rotational effects caused by radiation collected from radiation point sources on a 0 degree meridian, a 60 degree meridian and a 120 degree meridian of the eccentric radiation source 206. In particular, the CPU may determine a primary axis for individual images captured by the radiation sensor, wherein the primary axis may be indicated by the largest range of reflected light intensity detected by the radiation sensor 212. Additionally or alternatively, the CPU may determine the primary axis for the individual images captured by the radiation sensor, wherein the primary axis may be determined based on the activation of individual radiation point sources of the eccentric radiation source 206 such that the primary axis is aligned with a meridian of the eccentric radiation source 206. Accordingly, while the eccentric radiation source 206 has been described as having a 0 degree meridian, a 60 degree meridian, and a 120 degree meridian, the CPU may operate to normalize the axis of any meridians to based at least on the primary axis associated with the individual images.

At block 704, the CPU may extract a radiation intensity profile from each individual image of the series of normalized images based at least on a pupil diameter associated with the individual image. In particular, the CPU can extract a profile of the radiation intensity detected by the radiation sensor 212 for an image that captures the range of radiation intensity reflected by the one or more retinas, via the one or more pupils. As noted above, the CPU can determine a primary axis associated with the image, wherein the primary axis may be utilized to identify the radiation intensity profile to be extracted from the image. Additionally, the radiation intensity profile may be a series of radiation intensity values obtained from a normalized image along the primary axis at the pupil center. The radiation intensity values may be point values identified along the primary axis or an average of radiation intensity values at positions along the primary axis.

For example, at block 704, the CPU may identify a profile box aligned to and centered on the primary axis. Additionally or alternatively, the CPU may determine that the profile box includes a radiation intensity maximum and a radiation intensity minimum along the primary axis. The CPU may determine that the profile box is comprised of a first dimension and a second dimension, wherein the first dimension may be indicate a first number of radiation point values or pixels association with radiation point values that are substantially parallel to the primary axis while the second dimension may indicate a second number of radiation point values or pixels that are substantially perpendicular to the primary axis (e.g., the first dimension indicates that the profile box is comprised of 18 pixels along the primary axis and the second dimension indicates that the profile box is comprised of 11 pixels across the primary axis). The radiation intensity values for the radiation intensity profile may be determined for each position along the first dimension by averaging the radiation point values along the second dimension (e.g., for the first position along the primary axis, the CPU may average the 11 radiation point values in the second dimension at the first position to determine a first radiation point value for the radiation profile). Additionally, the profile of the radiation intensity can be extracted based at least on the pupil diameter determined for the individual image. For examples, the profile extracted from the individual image can be an 18×11 pixel box, depicting a range of radiation intensity for the individual image, where the pupil diameter is less than 4 mm. In some additional examples, the profile extracted from the individual image can be a 25×11 pixel box where the pupil diameter exceeds 4 mm. Accordingly, the radiation intensity profile for the primary axis of the normalized image may be generated from the radiation point values of the profile box.

At block 706, the example method can determine slopes for each radiation source eccentricity. In some examples, the CPU can process the profile box extracted from each individual image of the series of images such that a SE slope is determined for each eccentricity utilized by the radiation source 206 to produce the series of images. For example, the CPU may process the radiation intensity profile box and determine a linear function fitted to the data results to produce a slope associated with the eccentricity of the radiation point sources active when the image was captured. As noted above, the radiation intensity within the profile box may be averaged to generate, for example, a 1×18 or 1×24 pixel curve representing the radiation intensity profile for the normalized image. In some additional examples, each image of the series of images may be associated with a radiation point source that is further associated with a meridian and an eccentricity. Additionally, the linearized slope of the radiation intensity profile may be correlated with a refractive error based at least in part on the meridian (e.g., the 0 degree meridian, the 60 degree meridian, and/or the 120 degree meridian) and the eccentricity (e.g., the first eccentricity, the second eccentricity, the third eccentricity, and/or the fourth eccentricity at different radial distances from the radiation sensor) associated with the radiation point source that is active when each image is captured. Accordingly, for refractive errors along a meridian, different central profile slopes may correspond to different eccentricities.

At block 708, the CPU may call neural networks associated with the meridians of the radiation source 206 to generate refractive errors from the profile slopes. In particular, the CPU may utilize the neural networks to correlate the linear function and/or a linearized slope (e.g., an SE slope) of the radiation intensity profile with a refractive error for the primary axis of the normalized image, the meridian of the image, and/or the set of radiation point sources that are active when image is captured. For example, the CPU may generate a Sphere (Ds), Cylinder (Dc), and Axis (Ax) of the Cylinder from the SE slope values at the three meridians. Additionally, the CPU may generate the three parameters (e.g., Ds, Dc, and Ax) for the right eye and the left eye associated with the patient 202. For some additional examples, and as noted above, the refractive error for a meridian can be determined by the neural network based at least on correlations between different SE slopes and the active radiation point sources during image capture. The neural networks may be configured to correlate the SE slope of an image with the refractive error for the patient 202 by utilizing variations in radiation intensity caused by radiation point sources at different eccentricities along one meridian. As noted above, the neural networks may be trained by evaluated SE slopes and known refractive errors at the meridians from previously diagnosed images of patient eyes. Additionally, the pupil size of an eye may be utilized as an input to further correlate SE slopes with refractive errors for the neural networks. Further, the CPU may call one or more neural networks with the same structure determine the refractive errors at the meridians (e.g., the 0 degree meridian, the 60 degree meridian, and/or the 120 degree meridian) of the radiation source 206. Alternatively, the CPU may call one unified neural network with more complicated structure (e.g., more neurons and more weights) to determine the overall eye refractive error, Ds, Dc and Ax. The radiation intensity profiles may be utilized by the neural network(s) to determine Ds, Dc, and Ax utilizing calculations discussed by U.S. Pat. App. Pub. No. 2017/0027440 A1, the entire disclosure of which, except for any definitions, disclaimers, disavowals, and inconsistencies, is incorporated herein by reference.

In general, the described systems can utilize an eccentric radiation source to simplify the vision screening system such that excess complexity and operational difficulties can be eliminated from the system. Additionally, the described systems can be configured to utilize novel logic and algorithms for focusing collected radiation for image capture, capturing a series of images, and calculation of reflective error for a patient. For example, the system can synchronize activation of a radiation source and an image capture rate of a radiation sensor such that a series of images is captured within a timeframe that can minimize positional drift and reduce calculation loads for the processor. Further, the system can be configured to focus the radiation captured by the radiation sensor, normalize the images produced by the radiation sensor, and identify key parameters that enable the utilization of neural networks to determine refractive errors for the eyes of the patient and generate recommendations for future actions.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system, comprising:
  memory;
  one or more processors; and
  computer-executable instructions stored in the memory and executable by the one or more processors to perform operations comprising:
    causing an eccentric radiation source to generate one or more beams of near infrared (NIR) radiation that are directed onto a retina of a patient;
    causing a radiation sensor to collect information indicative of reflected NIR radiation from the retina, and to generate an analysis image based at least in part on the information;
    identifying, based at least in part on the analysis image, a pupil of the patient;
    determining a focus state of the analysis image;
    determining that the focus state of the analysis image satisfies a set of image state thresholds;
    based at least in part on determining that the focus state of the analysis image satisfies the set of image state thresholds, causing an image capture device to capture a plurality of images of the pupil;
    identifying a subset of the plurality of images that satisfy the set of image state thresholds;
    determining, based at least in part on the subset of the plurality of images,
      a plurality of pupil positions, and
      one or more radiation intensity profiles associated with the reflected NIR radiation detected by the radiation sensor; and
    determining a refractive error of the patient based at least in part on the plurality of pupil positions and the one or more radiation intensity profiles.

2. The system of claim 1, the operations further comprising:
  causing the eccentric radiation source to generate one or more beams of visible light that are directed onto the retina of the patient; and causing the radiation sensor to collect additional information indicative of reflected visible light from the retina.

3. The system of claim 1, the operations further comprising:
    causing the eccentric radiation source to activate a first set of radiation point sources, wherein the first set of radiation point sources is comprised of one or more first radiation point sources disposed at a first radial distance from the radiation sensor;
    causing the image capture device to capture a first image of the plurality of images, wherein the first image depicts the retina illuminated by the first set of radiation point sources;
    causing the eccentric radiation source to activate a second set of radiation point sources, wherein the second set of radiation point sources is comprised of one or more second radiation point sources disposed at a second radial distance, greater than the first radial distance; and
    causing the image capture device to capture a second image of the plurality of images, wherein the second image depicts the retina illuminated by the second set of radiation point sources.

4. The system of claim 3, the operations further comprising:
    causing the image capture device to capture a third image of the plurality of images, wherein the third image depicts the retina illuminated by a third set of radiation point sources disposed at a third radial distance from the radiation sensor;
    causing the image capture device to capture a fourth image of the plurality of images, wherein the fourth image depicts the retina illuminated by a fourth set of radiation point sources disposed at a fourth radial distance from the radiation sensor, and
    wherein:
        the third radial distance is less than the first radial distance, and
        the fourth radial distance is greater than the first radial distance and less than the second radial distance.

5. The system of claim 1, the operations further comprising:
    causing the eccentric radiation source to activate one or more first radiation point sources linearly extending from the radiation sensor at a first rotational offset;
    causing the image capture device to capture a first image of the plurality of images, wherein the first image depicts the retina illuminated by the one or more first radiation point sources;
    causing the eccentric radiation source to activate one or more second radiation point sources linearly extending from the radiation sensor at a second rotational offset; and
    causing the image capture device to capture a second image of the plurality of images, wherein the second image depicts the retina illuminated by the one or more second radiation point sources.

6. The system of claim 5, the operations further comprising:
    causing the eccentric radiation source to activate one or more third radiation point sources of a first meridian;
    causing the image capture device to capture a third image of the plurality of images, wherein the third image depicts the retina illuminated by the one or more third radiation point sources;
    causing the eccentric radiation source to activate one or more fourth radiation point sources of a second meridian; and
    causing the image capture device to capture a fourth image of the plurality of images, wherein the fourth image depicts the retina illuminated by the one or more fourth radiation point sources.

7. The system of claim 1, wherein determining a refractive error of the patient further comprises:
    generating, based at least on the one or more radiation intensity profiles, a linear function fitted to the one or more radiation intensity profiles; and
    determining, based at least on the linear function, at least one of a sphere (Ds), a cylinder (Dc), or an axis (Ax) of the cylinder for the patient.

8. The system of claim 7, wherein determining the refractive error of the patient further comprises:
    determining, based at least on the linear function, a spherical error (SE) slope associated with the linear function; and
    determining, based at least on the SE slope, the refractive error of the patient, wherein the refractive error is determined by a neural network algorithm trained to identify correlations between one or more active radiation point sources and the one or more radiation intensity profiles to determine the refractive error for the patient.

9. The system of claim 1, wherein identifying the pupil of the patient further comprises:
    determining at least a pupil position, a pupil diameter, and an inner pupil distance for one or more detected pupils; and
    determining at least a glint position, a glint intensity, and an image contrast for the one or more detected pupils.

10. The system of claim 9, wherein
    determining that the focus state of the analysis image satisfies the set of image state thresholds comprises:
        determining the pupil diameter satisfies a pupil diameter threshold,
        determining the inner pupil distance satisfies a pupil distance threshold,
        determining the glint intensity satisfies a glint intensity threshold, and
        determining the image contrast satisfies an image contrast threshold; and
    identifying the subset of the plurality of images comprises determining that each image in the subset of the plurality of images satisfies the pupil diameter threshold, the pupil distance threshold, the glint intensity threshold, and the image contrast threshold.

11. The system of claim 9, the operations further comprising:
    generating a recommendation to increase the distance between the patient and the radiation sensor based at least in part on the pupil diameter or the pupil inner distance exceeding an image state threshold of the set of image state thresholds; and
    displaying the recommendation via a user interface.

12. The system of claim 1, wherein identifying the plurality of pupil positions further comprises:
    determining, for a first image of the plurality of images, a first pupil position associated with the first image;
    identifying, for a second image of the plurality of images, a region of interest for the second images based at least on the first pupil position determined for the first image; and determining, based at least on the region of interest, a second pupil position associated with the second image,
wherein, a preceding pupil position from a preceding image is utilized to determine a successive region of interest associated with a successive image of the plurality of images such that a success pupil position is determined from the successive region of interest.

13. A system, comprising:
memory;
one or more processors; and
computer-executable instructions stored in the memory and executable by the one or more processors to perform operations comprising:
causing an eccentric radiation source, operably connected to the processor, to generate radiation that illuminates a pupil and a retina of a patient;
causing a radiation sensor, operably connected to the processor, to collect reflected radiation from the pupil and the retina of the patient, and to generate an analysis image based at least in part on the collected radiation;
determining a focus state of the analysis image;
determining that the focus state of the analysis image satisfies a set of image state thresholds;
based at least in part on determining that focus state of the analysis image satisfies the set of image state thresholds, causing the radiation sensor to capture a series of images;
identifying a subset of the series of images that satisfy the set of image state thresholds;
determining, based at least in part on the subset of the series of images, one or more parameters associated with a detected pupil;
generating a series of normalized images based at least in part on the subset of the series of images and the one or more parameters; and
determine a refractive error for the patient based at least in part on the series of normalized images.

14. The system of claim 13, wherein the one or more parameters associated with the detected pupil comprise at least one of:
a gaze deviation associated with an offset of the detected pupil associated with a direction of view for the patient;
a glint position associated with the detected pupil;
a Gaussian filter configured to smooth a plurality of intensity readings associated with the detected pupil; or
a rotational correction associated with at least the eccentric radiation source.

15. The system of claim 13, wherein determining the refractive error further comprises:
extracting, for each normalized image of the series of normalized images, an intensity profile;
determining, based at least in part on the intensity profile, spherical error data for the patient; and
determining, based at least in part on the spherical error data, the refractive error for the patient.

16. The system of claim 15, wherein determining refractive error further comprises determining, based at least in part on the spherical error data, refractive error parameters associated with one or more meridians of the eccentric radiation source.

17. The system of claim 1, wherein:
the eccentric radiation source comprises a first plurality of radiation sources and a second plurality of radiation sources,
a lens of the radiation sensor is disposed substantially centrally between the first plurality of radiation sources and the second plurality of radiation sources, and
causing the image capture device to capture the plurality of images comprises maintaining the lens at a substantially stationary position, relative to the patient, while the plurality of images is captured.

18. The system of claim 1, wherein the one or more processors comprises a first processor operably connected to the eccentric radiation source, and a second processor of a handheld user device,
the second processor being configured to synchronize capture of the plurality of images by the image capture device with illumination of the pupil by the eccentric radiations source.

19. The system of claim 1, wherein:
the image capture device, the eccentric radiation source, and the radiation sensor are supported by a housing of the system;
a first image included in the plurality of images is captured using illumination emitted by a first radiation source of the system disposed at a first location on the housing, and
a second image included in the plurality of images is captured using illumination emitted by a second radiation source of the system different from the first radiation source, the second radiation source being disposed at a second location on the housing different from the first location.

* * * * *